(No Model.)
W. A. WRIGHT.
GUIDE FOR SAWING MACHINES.
No. 248,823. Patented Oct. 25, 1881.
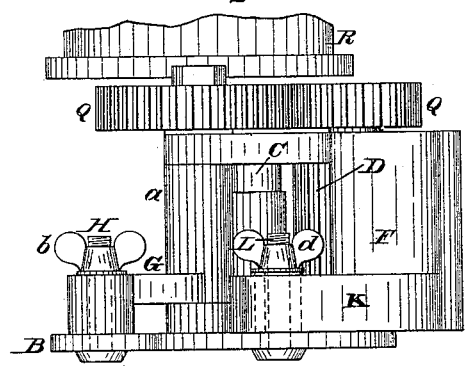
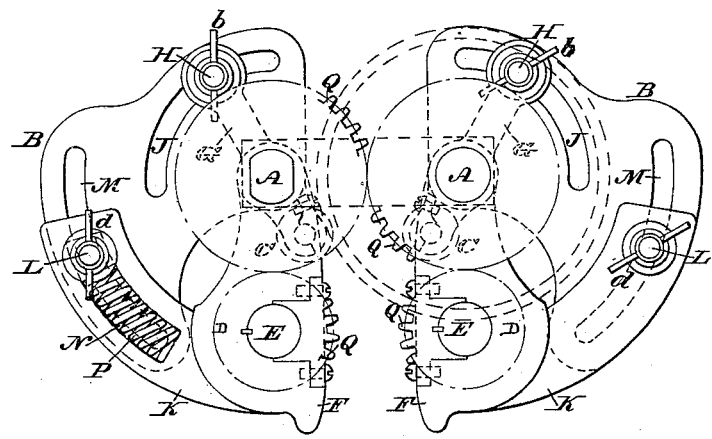
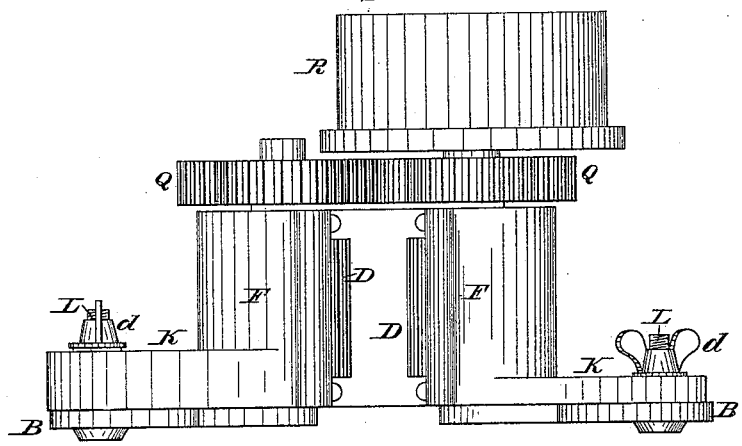
WITNESSES:
George L. Plitt.
W. F. Kircher
INVENTOR:
Wm. A. Wright,
BY John A. Wiedersheim
ATTORNEY.

United States Patent Office.

WILLIAM A. WRIGHT, OF CENTRETON, NEW JERSEY, ASSIGNOR TO ISAAC R. KULP, OF HATFIELD, PENNSYLVANIA.

GUIDE FOR SAWING-MACHINES.

SPECIFICATION forming part of Letters Patent No. 248,823, dated October 25, 1881.

Application filed August 9, 1881. (No model.)

*To all whom it may concern:*

Be it known that I, WILLIAM A. WRIGHT, a citizen of the United States, residing at Centreton, in the county of Burlington, State of New Jersey, have invented a new and useful Improvement in Guides for Sawing-Machines, which improvement is fully set forth in the following specification and accompanying drawings, in which—

Figure 1 is a side elevation of the sawing-machine guide embodying my invention. Fig. 2 is a top or plan view thereof, certain portions being removed. Fig. 3 is a front view thereof.

Similar letters of reference indicate corresponding parts in the several figures.

My invention consists of a guide for sawing-machines having feeding and guiding rollers adjustable relatively to the thicknesses of the board or timber to be directed to the saw, the construction, combination, and operation being hereinafter set forth.

Referring to the drawings, A A represent upright shafts, which rise from beds B and support vertical guide-rollers C C, whose bearings are formed with bosses *a*, through which the shafts pass.

D D represent vertical feed-rollers, which are mounted on shafts E E, the latter being connected to heads F F, which are mounted on the shafts A A, it being noticed that the rollers C D are parallel, and the feed-rollers, preferably toothed, are in advance of the guide-rollers.

Each boss *a* has formed with or secured to it an arm, G, the outer end whereof carries a bolt, H, which is fitted in a segmental slot, J, in the bed B, the head of the bolt being on the under side of the bed, and the end or point thereof on the upper side of the arm G, where it is provided with a nut, *b*, for tightening purposes.

Each head F has formed with or secured to it a segmental arm, K, which carries a bolt, L, the latter being passed through a segmental slot, M, in the bed B, the head of the bolt being underneath and the end or point above, where it is provided with a nut, *d*, for tightening purposes.

One of the arms K is formed with a segmental slot, N, in which is fitted a spring, P, which bears against the arm and the bolt L thereof.

The shafts A and E carry spur-wheels Q, which mesh with each other, whereby the feed-rollers are simultaneously operated and power is applied to one of the spur-wheels by means of a belt, band, or other wheel, R, which is connected to said spur-wheel, or the shaft thereof.

It will be seen that by loosening the bolts H L the feed rollers and guide-rollers may be set so as to adjust the space between each set of rollers relatively to the dimensions of the board or timber to be passed through them. Then the bolts are tightened and the wheel R is operated, after which the board is run through true to the saw.

Should there be any inequalities in the board, or the board be presented irregularly to the feed-rollers, the head F, which carries the spring P, yields, as the bolt L, though tightened on the bed B, is free in the slot N of the arm K of said head, the spur-wheels always remaining in gear, even when the head yields, but the feed-rollers force the board forward between the guide-rollers, so that it is caused to move true and without slipping.

It will also be seen that the device is simple and compact, the heads F and guide-rollers C being mounted on the shafts A as common axes, and the beds B, having slots for the bolts of each arm G K, and the several parts occupying small space, may be made heavy and strong.

Having thus described my invention, what I claim as new, and desire to secure by Letters Patent, is—

1. The yielding head or heads F, the feed-rollers, the guide-rollers, and the spur-wheels, gearing with each other, mounted on the axes or shafts of the feed and guide rollers, all combined and operating substantially as and for the purpose set forth.

2. The pivotal heads F, with the feed-rollers D journaled thereto, the guide-rollers C, with bearings having bosses *a*, and the shafts A A, the latter being common to said heads F and said guide-roller bearings, the parts being combined and operating substantially as and for the purpose set forth.

3. Feed-rollers having their bearings mounted on vertical axes or shafts, guide-rollers having their bearings mounted on vertical axes or shafts, the bed with segmental slots, and adjustable and tightening bolts for said bearings, combined and operating substantially as and for the purpose set forth.

4. The feed-rollers D, the head F, with the arm K having a segmental slot, N, the spring P, the bolt L, the guide-rollers C, arms G, bolts H, and the bed with the segmental slots M J, combined and operating substantially as and for the purpose set forth.

WM. A. WRIGHT.

Witnesses:
JOHN A. WIEDERSHEIM,
GEORGE L. PLITT.